United States Patent Office 2,772,157
Patented Nov. 27, 1956

2,772,157

PRODUCTION OF MIXED FIBROUS SHEET MATERIAL

Osborn H. Cilley and Robert L. Moore, Manheim, Pa., and Izador J. Novak, Trumbull, Conn., assignors to Raybestos-Manhattan, Inc., Passaic, N. J., a corporation of New Jersey No Drawing. Application March 16, 1953,
Serial No. 342,724

8 Claims. (Cl. 92—3)

This invention relates to the production of smooth, strong, high temperature resistant, water-laid, felted fibrous sheets composed of glass fibers and asbestos fibers, particularly suitable for use as electrical and other insulation purposes and is a continuation-in-part of our copending application Serial No. 283,132, filed April 18, 1952, now abandoned.

The product and process of the present invention are characterized by the employment and ability to employ relatively long glass fibers of the type used in glass filament yarn, in appreciable quantity, and in combination with asbestos fibers whereby to form a composite sheet of novel character and wherein the respective fiber characteristics complement and enhance each other greatly, as distinguished from the respective deficiencies of sheets felted from one of the two types of fibers alone.

The present invention is further characterized and its objects accomplished by the employment of a colloidal dispersion of chrysotile asbestos fibers in an aqueous vehicle, the employment of which, as we have found in accordance with the present invention, permits the dissemination therewith and suspension therein of relatively long glass fibers carrying a firmly adherent organic coating fixed on the surfaces thereof, and the production therefrom, on conventional paper making apparatus, of composite fibrous sheets of over-all fine, smooth character.

The production of colloidal dispersions of chrysotile asbestos fibers, employed herein, is more particularly described in the I. J. Novak United States Patent No. 2,626,213, said patent also describing the production of water-laid felted fibrous asbestos sheets therefrom and the novel properties of such dried residues or sheets. Although such sheets are much stronger and tougher than conventional asbestos paper, they are relatively soft, weak, and densely packed as compared to glass fiber sheets which are relatively harsh, strong, and porous. Glass fibers are comparatively large, of great strength, but fragile to abrasion against each other; whereas asbestos fibers are much smaller, relatively weak, but not fragile. When admixed, the properties of these two fibers complement each other: the cushioning effect of the softer, weaker, much finer asbestos fiber between the hard incompressible glass fibers prevents them from injuring each other and fills the interstices to give the product an over-all fine, smooth structure.

Furthermore, one of the serious deficiencies of an all-glass fiber sheet is that on exposure to heat above the melting point of the glass, say above 1500° F., it fuses to globules which have lost all resemblance to a sheet; whereas the combination of glass fiber and asbestos, while it becomes more brittle, does not melt down even when the glass content is 80%, but shrinks somewhat and retains its sheet form without blistering, crumbling, or distortion. In electrical insulation this quality of largely retaining its "space factor," or its spacing apart of insulated conductors under such destructive conditions, is an extremely valuable property of high temperature resistant insulation. In most high temperature electrical insulation uses, this quality spells the difference between continued insulation and short circuiting, when exposed to flame. An all asbestos sheet has the property of retaining its space factor, but it was not predictable that an asbestos sheet containing a large proportion of glass fiber would also stand up so well under flame temperatures.

By the present invention, a smooth, heat-resistant sheet is obtained, wherein great strength is derived from the glass component, and a cushioned structure from the asbestos component. This set of properties causes this combination sheet to be of greater value for laminations, electrical insulation, and heat resistant uses, than either the all-glass or all-asbestos sheet by itself. Good strength is of great importance in treating thin sheet material because of the tension required to keep such sheets free from wrinkles during wetting and drying processes.

The presence of the coated glass fibers improves the paper making properties of the colloidal dispersion of asbestos fiber by providing a freer, less plastic wet web than with colloidally dispersed asbestos alone; and, conversely, the viscous properties of the colloidal dispersion of asbestos make it possible to maintain the fine, coated glass fibers individualized and uniformly distributed in the paper making slurry of the combined fibers. The coated glass fibers are, of course, not colloidally dispersed, being much too large, their diameter being ordinarily 5 to 10 microns. Even the finest available glass fiber at .75 micron diameter is above the colloidal range of size. Asbestos fibers in which the unit fibers are $\frac{1}{50}$ to $\frac{1}{20}$ micron are well within the colloidal range and a colloidal dispersion of them can be made and is employed here.

We find that it is necessary for the practice of the present invention to use coated glass fibers; that is, glass fibers carrying a wettable, firmly adhered, water insoluble, hardened organic coating which, although it may be very thin, adheres tightly to the ordinarily highly hydrophilic surface of the glass fibers throughout the mixing and paper making operations in the presence of colloidal asbestos and colloidizing agents. Uncoated glass fibers, or glass fibers carrying a temporary and water removable coating which, because of solubility in the liquid medium or poor resistance to abrasion during mixing, for example, oily or greasy lubricants, leaves the glass surface unprotected, do not disperse in the asbestos colloid and clot undesirably and do not allow the formation of a smooth glass slurry, as do glass fibers with the indicated proper coating. A film tacky when wet, or one non-wettable by water, or detergent-containing water, is also undesirable.

Satisfactory coatings are those which are known for application to glass fiber later to be used to provide good adherence to plastics such as phenolic, urea, melamine, polyester, acrylic, and the like resins. These coatings may be of the strongly glass surface adherent types such as those containing suitable Werner complexes, for example, a type of Werner complex compound based on an atom selected from the group consisting of chromium, cobalt, nickel, copper and lead having coordinated therewith an acido group having 1 to 6 carbon atoms and containing a labile hydrogen group, and other bonding agents as described in Steinman U. S. Patent No. 2,552,910. Example 3 of said patent specifies a type of coating composition which we have found satisfactory. Others are butylated urea resin, water soluble urea formaldehyde, or melamine formaldehyde resin where the coating is baked on to harden and insolubilize it in water. Proteins of the type of gelatin and albumin may also be employed, but these must be set, e. g., with formaldehyde or chromates.

Additional examples of satisfactory coating compounds strongly adherent to glass are the Werner type chromium compounds described in United States Patents 2,273,040; 2,356,161; 2,544,666; 2,544,667; 2,544,668; 2,552,910; and 2,611,718; hydrolyzed ethyl silicate and vinyl acetate resin described in U. S. Patent 2,215,048; alkyd resins as described in U. S. Patent 2,258,708; polyvinyl butyral as described in U. S. Patent 2,354,110; phenyl ethyl silicone as described in U. S. Patent 2,371,050; organic polysiloxane as described in U. S. Patent 2,392,805; urea formaldehyde, melamine formaldehyde and alkyd resin as described in U. S. Patent 2,397,242; resorcinol formaldehyde resin as described in U. S. Patent 2,403,872; heat treated dextrinized starch as described in U. S. Patent 2,446,119; protein-formaldehyde (gelatin, blood, albumen, casein) as described in U. S. Patent 2,477,407; allyl silicates as described in U. S. Patent 2,513,268; organo silicon halides followed by resin coating as described in U. S. Patent 2,557,786; diallyl diethoxy silane and other silanes as described in U. S. Patent 2,563,288; and polyvinyl acetal as described in U. S. Patent 2,572,407. All these substances applied to the glass meet the requirements of strong adhesion, water insolubility and freedom from tack while wet, which are the essentials for a satisfactory protective film.

It should be noted that even with these coated glass fibers, they do not disperse to individuals in plain or detergent-containing water, and also do not disperse in a slurry of asbestos fibers containing no colloidizing agent. The asbestos must be colloidized to suspend these precoated glass fibers as individuals, and this combination is necessary for our purpose. "Glass fibers" herein mentioned is intended to mean the coated glass fibers above mentioned.

In preparing the aqueous slurry of asbestos and coated glass fibers, we may combine the two in any order. For example, the dry fibers may be mixed in suitable proportion, then added to the requisite amount of water containing asbestos colloidizing agent, followed by agitation to colloidally disperse the asbestos fibers and disseminate and suspend the coated glass fibers therein. Another procedure is to first prepare a heavy slurry of asbestos fibers in water containing the asbestos colloidizing agent, then add the coated glass fiber, and thereafter add more water and agitate the whole. In a preferred procedure we first prepare the colloidal dispersion of the asbestos fibers and then add the coated glass fibers with suitable stirring to individualize the coated glass fibers and to thoroughly disseminate them throughout and suspend them in the colloidal dispersion of the asbestos fibers.

As more particularly described in the aforesaid Novak Patent No. 2,626,213, a colloidal dispersion of asbestos fibers may be prepared from chrysotile asbestos agglomerates, such as, for example, mill fiber of long or spinning grade length (bagged asbestos fiber of commerce), by placing same in a vessel equipped with vertical cylindrical mixing bars, and gradually mixed therein with water containing chrysotile asbestos colloiding agent to form a slurry of desired concentration for subsequent sheeting on a paper making machine. The amount of colloidizing agent employed varies with the character of the particular agent, the amount of asbestos, and the concentration of the slurry. Thus the aqueous solution should contain an amount of colloidizing agent first effective to subdivide the asbestos agglomerates into fibrils of colloidal size and to saturate the fibril surfaces with and to deposit thereon an adsorbed layer of said agent; and second to colloidally disperse said saturated fibrils, this being accomplished by employing an amount of agent in excess of that adsorbable on the asbestos and providing an added or free colloidal dispersion forming and maintaining increment, whereby a stable colloidal dispersion of fine fibers is formed, the majority having a diameter of between 200 and 500 angstrom units. These colloidal dispersions are of a gelatinous, viscous character, the viscosity increasing with increase in colloidal fiber content or concentration.

For the purpose of insuring stability of the colloidal dispersion in subsequent handling, the amount of colloidizing agent added is generally in excess of the minimum amount required to maintain the colloidal dispersion above its break point, or the concentration of the slurry at which more water, without addition of agent, would cause the colloid to break, the asbestos fibers to clot, and the fibers become again agglomerated. This excess agent may be from about 10% to 100% or more, and in addition to insuring stability of the colloidal dispersion, increasing amounts tend to increase the viscosity of the colloidal dispersion. This is desirable in the practice of the present invention for the purpose of aiding in suspending increasingly larger proportions of coated glass fibers. The admixture of individualized coated glass fibers with a colloidal dispersion of asbestos fibers further increases the viscosity of the resultant mixture.

The coated glass fibers employed are those of the readily available present commercial range, having a diameter below 10 microns, and preferably 6 to 10 microns, although fiber of somewhat larger diameter may be used if coarseness of the paper is not critical, and smaller diameter, down to ¾ micron, will give a correspondingly finer structure. A suitable commercial source of glass fiber is continuous filament glass yarn composed of strands each comprised of 204 filaments of about 6 microns in diameter. The coating of the glass filaments is usually applied during the process of making the yarn, between the filament-forming stage and the condensation of the filaments into the yarn. The yarn is chopped into lengths of from about ⅛ inch to about one inch, and preferably about ½ inch. This cut glass yarn is to be distinguished from ordinary mineral or slag wool which is too defective in glass quality, too impure, and too coarse for the practice of the present invention, and does not, unless intentionally done, carry a coating of the required type.

The amount of coated glass fiber which can be incorporated and stably distributed with a colloidal dispersion of asbestos fibers, as previously indicated, is to some extent dependent upon the viscosity of the colloidal asbestos dispersion and that of the final coated glass fiber: colloidal asbestos dispersion, and should thus be correlated thereto. The addition of the coated glass fiber to the asbestos dispersion increases the viscosity; the more glass, the higher the viscosity of the combination. If the viscosity of a glass-asbestos slurry drops much below twice that of water, the glass fibers tend to form clots of considerable size and the uniformity of the slurry is spoiled. The more glass in the slurry the higher the viscosity needed for safe storage, and the shorter the safe period of stirring below the stable viscosity before the glass fiber begins to "ball up" and separate out. By controlling the viscosity, we can form mixes composed of from about 1% to about 75% of coated glass fibers, and preferably from about 10% to about 60% of glass of the total weight of the fibrous components.

The mixing of the chopped strands of coated glass fibers with the colloidal dispersion of asbestos fibers serves to open up the strands and individualize the coated glass fibers and to uniformly distribute them with the asbestos fibers and stably suspend them in the colloidal dispersion.

The following specific examples are illustrative of the present invention:

Example I

A colloidal dispersion of chrysotile asbestos fibers in water, composed of .375% by weight of asbestos, and .187% sodium oleate as the dispersing agent, had a viscosity of approximately twice that of water, i. e. 15 seconds as compared to 8 seconds for water at ordinary room temperature as determined by employing a simple 60° glass funnel with a $\frac{3}{16}$ inch inside diameter stem 2 inches long, holding about 300 cc. liquid when full. The test is made by determining the time in seconds for 250 grams of liquid to pass through. The viscosities relative to water mentioned herein are based on this relationship.

The foregoing dispersion at the indicated dilution and with the indicated dispersing agent could have been prepared with approximately 25% of sodium oleate by weight of the asbestos, and thus the agent is 100% in excess. Upon mixing coated glass fibers, of the character previously described, with the colloidal asbestos dispersion to form a substantially homogeneous mixture, it was found that it could readily support up to 100% of coated glass fibers by weight of the asbestos fibers. At this total fiber concentration of .75% the slurry had a final viscosity of five times that of water, and the slurry was storage stable and the glass fibers remained suspended in an individualized manner.

*Example II*

A colloidal dispersion of chrysotile asbestos of #3 grade, Canadian standard (spinning grade length) was prepared as follows: In 7,500 lbs. water there was combined 150 lbs. ammonium oleate as the asbestos dispersing agent, and 200 lbs. 3 K Canadian asbestos fiber, with stirring until the mixture was uniform, whereupon 100 lbs. ½" long chopped strand, cut from glass yarn, was added. The glass yarn carried a coating of the type of Example 3 of U. S. Patent 2,552,910. Each strand comprised 204 filaments about 6 microns in diameter. The heavy slurry (approximately 4% solids) was then mixed until both the asbestos and glass fiber were thoroughly distributed and intermingled. The slurry was then diluted by addition of water to 1% solids, and passed through slotted screens and centrifugal separators to remove foreign and oversize material. There was no selective separation of the glass fiber, in spite of its relatively large size, compared with asbestos fiber. This further indicated the uniform quality of the mix. The slurry was then at pH 9, which was then raised to pH 10 by the addition of KOH, a procedure which improves the freeness and reduces the adhesiveness of colloidal asbestos dispersions of the water-soluble fatty acid soap type without damage to the dispersions, as more particularly described and claimed in the copending application of I. J. Novak, Serial No. 279,951, filed April 1, 1952, now Patent No. 2,652,325. The viscosity of the slurry was about 2½ times that of water.

The prepared slurry was then run off on a tissue type Fourdrinier paper machine equipped with sprays of dilute (.1%) soap water to avoid breaking the asbestos dispersion. Thicknesses from 1 mil to 10 mils were made, all sheets being smooth, firm, well formed, and of very uniform glass fiber distribution. Without very close examination it was not possible to distinguish the glass fiber content. It contained about 40% of glass fiber, since more asbestos passes through the Fourdrinier wire during formation than the longer fibered glass. The 10 mil sheet which weighed 8 grams per square foot, however, was considerably stronger and tougher than equivalent weight asbestos sheets, and felt almost like a thin suede leather. It broke when fresh at two pounds per inch of width. After one week, it broke at nine pounds per inch of width. When heat treated one minute at 1350° F., which burns off the organic matter left from the soap treatment, the 10 mil sheet had a breaking strength of ten pounds per inch of width. It had good wet strength, both in water and in solvents. On heating in a Bunsen burner blue flame at a red heat for several minutes, it did not blister, crumble, develop holes or collapse, but retained its sheet form, with only slight shrinkage. The heat treatment may be used to improve wet strength, or a starch, glue, or other treatment may be applied to the original sheet, depending on the subsequent use.

*Example III*

One hundred pounds of #3 F (spinning grade) Canadian chrysotile asbestos fiber was added to 300 pounds of a 25% solution of dioctyl sodium sulfosuccinate (Aerosol O. T.) as the asbestos colloidizing agent; 2175 pounds of water was further added and mixed for four hours to form a 4% colloidal asbestos dispersion. This was further diluted with water to a 0.50% asbestos content, and passed through paper type slotted screens and centrifugal vortex separators to remove impurities such as sand and unopenable splinty asbestos material and then over magnetic rolls to remove residual particles of magnetite. While mixing, 100 pounds of ½-inch long cut strand from glass yarn (204 filaments per strand, each 6 microns in diameter) was added and mixed for one-half hour. The glass yarn was of the type commonly used for polyester impregnation carrying a coating of the Werner type chromium compound previously referred to (Owens Corning #863). This was rescreened to remove overlength glass strands which occur in the cut strands of glass yarn. At this point the dispersion had a fiber concentration of glass plus asbestos of 1.00%, a viscosity five times that of water, was of a smooth character with no glass fibers showing, the glass filaments having become interspersed with the colloidal asbestos fibers in a substantially homogeneous mixture, and the glass fibers remained suspended by reason of the viscosity of the dispersion and by reason of suspension by and entrainment with the colloidally dispersed asbestos. Uniformity of asbestos and glass dispersion was evidenced by the high shimmer of the slurry while in motion.

This slurry was sheeted out as previously, on a paper making machine, into paper of about 10 mils thickness and a weight of .015 pound per square foot. The glass content of this sheet was 60%.

In the foregoing example, the colloidal dispersion of asbestos alone at the indicated dilution could have been prepared with 15–20% of Aerosol O. T. by weight of the asbestos, and ordinarily this amount is doubled for safety in handling and storage. Since in the present example 100 parts of asbestos to 100 parts of glass was employed, added suspending agent for the coated glass fibers is desirable, and this is accomplished by employing a greater excess of Aerosol O. T., it having been found that the added agent improves the stability of the colloidal asbestos dispersion to mechanical abrasion by the very much larger diameter (300 to 1) glass fibers. Otherwise this mechanical abrasion might reduce the asbestos fiber to much shorter lengths and would result in lower viscosity for the colloidal asbestos dispersion and thereby allow the coated glass fibers to become aggregated or clotted. Control by restricting the dilution to hold the viscosity above twice that of water, and preferably higher, is also effective even when minimum dispersing agent is used. Viscosities up to eight times that of water will make smooth paper, because of the uniform, unclotted character of the colloidal asbestos dispersion and the uniform glass distribution. This is particularly desirable for heavy papers. For thin papers or tissues a lower solids content and viscosity must be used to get good fiber distribution in the tissue.

The proportion of the coated glass fiber of either of the foregoing examples in clear water, upon agitation, resulted only in shortening of the filaments and entangling and clotting, and could not be made into paper. Even the use of this coated glass fiber alone in the above dilutions but containing the full indicated amounts of asbestos colloidizing agent did not produce an individualized suspension of the glass fibers, and they were still clotted and entangled on mixing, and rapidly settled out. It was therefore unexpected that the coated glass fibers would remain separated, suspended, individualized, and free from clots in combination with a colloidal dispersion of asbestos fibers in accordance with the present invention.

Although it is convenient to add a suitable excess of asbestos collodizing agent beyond that necessary to provide safety in handling and storage of the colloidal asbestos dispersion, for the purpose of providing an added glass fiber suspending component, and even though the usual excess is generally adequate for suspending appreciably large proportions of glass fiber, we may add other viscosity builders, such as polyvinyl alcohol, methyl cellulose, carboxy methyl cellulose, alginates, and other water soluble thickening agents, instead of excess colloidizing agent to act as supplemental suspending agents. Thus, the necessary viscosity may be obtained by concentration of the asbestos:glass slurry, by selection of asbestos fiber types or lengths which give different viscosities; e. g., for any given concentration the viscosity of a colloidal asbestos increases with fiber length, by the addition of viscosity builders or other means such as more or less fiber opening, temperature, etc.

It will of course be understood that other asbestos colloidizing agents may be employed according to the methods and procedures described in the aforesaid Novak Patent 2,626,213.

The sheet material of the present invention accepts impregnation readily and uniformly. Such use, for example, may be for phenol resin or melamine resin bonded laminates in sheet, rod, or tube form. When impregnated with vinyl resins and slit into tape width, the sheet material of the present invention will provide a superior type insulating tape for the insulation of heat and flame-resistant wires and cables. When coated with silicone resins, silastic rubbers or polyfluorocarbons, the sheet will provide a superior type heat-resisting insulation for slot liners and separators in the winding of heavy duty electric motors.

Other uses for the sheet material of the present invention are such as for slitting into tapes and spinning into yarn in accordance with the method described in the Novak-Palm United States Patent No. 2,578,941. Thus a sheet formed in accordance with the present invention and composed of the dried residue of a colloidal dispersion of spinning grade chrysotile asbestos fibers and containing 10% by weight of glass fibers of the character previously described, and having a weight of .55 gram per square foot, was slit into tapes and spun into a 50 cut yarn in accordance with the aforesaid patent. It exhibited a tensile strength for a single strand of 1.54 pounds as compared to 1.28 for a like asbestos sheet without glass fiber.

We claim as our invention:

1. A smooth water-laid felted fibrous sheet comprised of the dried residue of an alkaline colloidal dispersion of chrysotile asbestos fibers, said sheet including individualized cut glass yarn fibers substantially uniformly distributed therethrough, the glass fibers carrying a wettable, water-insoluble, strongly adherent hardened organic film coating.

2. A smooth water-laid felted fibrous sheet comprised of the dried residue of an alkaline colloidal dispersion of chrysotile asbestos fibers of spinning grade length, said sheet including individualized relatively long cut glass yarn fibers substantially uniformly distributed therethrough, the glass fibers carrying a wettable, water-insoluble, strongly adherent hardened organic film coating.

3. A smooth water-laid felted fibrous sheet comprised of the dried residue of an alkaline colloidal dispersion of chrysotile asbestos fibers, said sheet including from about 1% to about 75% by weight of individualized cut glass yarn fibers of from about ⅛ to about 1 inch in length and less than about 10 microns in diameter substantially uniformly distributed therethrough, the glass fibers carrying a wettable, water-insoluble, strongly adherent hardened organic film coating.

4. A smooth water-laid felted fibrous sheet comprised of the dried residue of an alkaline colloidal dispersion of chrysotile asbestos fibers, said sheet including from about 10% to about 75% by weight of individualized cut glass yarn fibers of from about ⅛ to about 1 inch in length and from about 5 to about 10 microns in diameter substantially uniformly distributed therethrough, the glass fibers carrying a wettable, water-insoluble, strongly adherent hardened organic film coating.

5. The method of forming a smooth sheet composed of a substantially homogeneous mixture of asbestos and glass fibers, which comprises mixing glass filaments of less than about 10 microns in diameter and of from about ⅛ to about 1 inch in length derived from cut glass yarn and carrying a wettable, water-insoluble, strongly adherent hardened organic film coating, with an aqueous alkaline colloidal dispersion of chrysotile asbestos fibers containing organic chrysotile asbestos colloidizing agent to uniformly distribute the fibers with each other, and then filtering the aqueous liquid from the mixture.

6. The method of forming a smooth sheet composed of a substantially homogeneous mixture of asbestos and glass fibers, which comprises mixing glass filaments of from about 5 to about 10 microns in diameter and of from about ⅛ to about 1 inch in length derived from cut glass yarn and carrying a wettable, water-insoluble, strongly adherent hardened organic film coating, with an aqueous alkaline colloidal dispersion of chrysotile asbestos fibers of spinning grade length containing organic chrysotile asbestos colloidizing agent to form a slurry having a viscosity at least twice that of water and to thereby stably suspend the glass filaments in the colloidal asbestos dispersion, and then filtering the aqueous liquid from the mixture.

7. The method of forming a smooth strong sheet composed of a substantially homogeneous mixture of asbestos fibers and from about 1% to about 75% of glass fibers by weight of the composite, which comprises mixing glass filaments of less than about 10 microns in diameter and from about ⅛ to about 1 inch in length derived from cut glass yarn and carrying a wettable, water-insoluble, strong adherent hardened organic film coating, with an aqueous alkaline colloidal dispersion of chrysotile asbestos fibers containing organic chrysotile asbestos colloidizing agent to form a slurry having a viscosity of from about twice to about eight times that of water to thereby stably suspend said glass filaments therein and to uniformly distribute the fibers with each other in an individualized manner, and then felting said fibers on a foraminous carrier of a paper making machine.

8. A stable substantially homogeneous paper making slurry comprised of an aqueous alkaline colloidal dispersion of chrysotile asbestos fibers including from about 1% to about 75% of glass fibers by weight of the total fibers, said glass fibers being from about ⅛ inch to about 1 inch in length and from about 5 to about 10 microns in diameter derived from cut glass yarn, and substantially uniformly distributed through and stably suspended in an individualized manner in said colloidal dispersion of asbestos fibers, the glass fibers carrying a wettable, water-insoluble, strongly adherent hardened organic film coating.

References Cited in the file of this patent

UNITED STATES PATENTS

| Number | Name | Date |
|---|---|---|
| 1,119,103 | Moeller | Dec. 1, 1914 |
| 1,887,726 | Weber | Nov. 15, 1932 |
| 2,225,100 | Clapp | Dec. 17, 1940 |
| 2,354,110 | Ford et al. | July 18, 1944 |
| 2,457,775 | Ebaugh | Dec. 28, 1948 |
| 2,469,409 | Powers et al. | May 10, 1949 |
| 2,566,960 | Philipps | Sept. 4, 1951 |
| 2,568,023 | Perry | Sept. 18, 1951 |
| 2,568,144 | Cremer et al. | Sept. 18, 1951 |
| 2,581,069 | Bertolet | Jan. 1, 1952 |
| 2,620,851 | Brown | Dec. 9, 1952 |
| 2,626,213 | Novak | Jan. 20, 1953 |
| 2,653,090 | Crandall | Sept. 23, 1953 |
| 2,661,287 | Barbaras | Dec. 1, 1953 |